(12) United States Patent
Sarkkinen et al.

(10) Patent No.: US 7,970,595 B2
(45) Date of Patent: Jun. 28, 2011

(54) SIMULATION OF MULTI-ANTENNA RADIO CHANNEL

(75) Inventors: Timo Sarkkinen, Kempele (FI); Tommi Jämsä, Oulu (FI)

(73) Assignee: Elektrobit System Test Oy, Oulunsalo (FI)

( * ) Notice: Subject to any disclaimer, the term of this patent is extended or adjusted under 35 U.S.C. 154(b) by 407 days.

(21) Appl. No.: 11/917,844

(22) PCT Filed: Jun. 23, 2005

(86) PCT No.: PCT/FI2005/050237
§ 371 (c)(1),
(2), (4) Date: Dec. 17, 2007

(87) PCT Pub. No.: WO2006/136645
PCT Pub. Date: Dec. 28, 2006

(65) Prior Publication Data
US 2008/0215300 A1 Sep. 4, 2008

(51) Int. Cl.
G06G 7/62 (2006.01)
(52) U.S. Cl. ........................................ 703/13
(58) Field of Classification Search ............... 703/13
See application file for complete search history.

(56) References Cited

U.S. PATENT DOCUMENTS

| 4,969,118 | A | * | 11/1990 | Montoye et al. | 708/501 |
|---|---|---|---|---|---|
| 6,081,225 | A | * | 6/2000 | Tsai et al. | 342/195 |
| 7,054,781 | B2 | * | 5/2006 | Kolu et al. | 702/122 |
| 7,394,880 | B2 | | 7/2008 | Kemppainen et al. | |
| 7,430,413 | B2 | | 9/2008 | Fleury et al. | |

FOREIGN PATENT DOCUMENTS

| JP | 11145917 A | 5/1999 |
|---|---|---|
| JP | 2001160789 A | 6/2001 |
| JP | 2005509361 T | 4/2005 |
| JP | 2005510945 T | 4/2005 |
| WO | WO 03/041308 | 5/2003 |
| WO | WO 2005008926 | 1/2005 |

OTHER PUBLICATIONS

Tommi Jamsa et al., "Implementation techniques of Broadband Radio Channel Simulators", 2001, Vehicular Technology Conference, pp. 433-437.*
Sau-Gee Chen et al., "New systolic arrays for matrix multiplication", 1994 International Conference on Parallel Processing, pp. II-211-II-215.*

(Continued)

Primary Examiner — Jason Proctor
Assistant Examiner — Russ Guill
(74) Attorney, Agent, or Firm — Hoffman & Baron, LLP

(57) ABSTRACT

The invention provides a device for simulating a multi-antenna radio channel, a module and a method. The device comprises channel modules for incorporating propagation effects into channel signals which represent radio signals propagating along propagation paths, which channel modules are electrically connected to neighbour channel modules for forming an (m,n) array configuration. The $(m,n)^{th}$ channel module is configured to receive a first $(m,n-1)^{th}$ channel signal and a second $(m-1,n)^{th}$ channel signal and comprises: a processing resource for processing the first $(m,n-1)^{th}$ channel signal according to a channel model, thus generating a processed $(m,n)^{th}$ channel signal, and a combiner for combining the processed $(m,n)^{th}$ signal and the second $(m-1,n)^{th}$ channel signal, thus generating a second $(m,n)^{th}$ channel signal. The $(m,n)^{th}$ channel module is further configured to output the second $(m,n)^{th}$ channel signal.

6 Claims, 6 Drawing Sheets

OTHER PUBLICATIONS

Jae-Jin Lee et al., "Implementation of the Super-Systolic Array for Convolution", 2003, 2003 Asia and South Pacific Design and Automation Conference, pp. 491-494.*

J. Kolu et al., "A real-time simulator for MIMO radio channels", 2002, the 5th international symposium on wireless personal multimedia communications, pp. 568-572.*

Jamsa et al., "Real-Time Simulation of Adaptive Array Antenna using Broadband Vector Channel Simulator," 5th International Symposium on Wireless Personal Multimedia Communications, Conference Proceedings vol. 1. pp. 188-192, Oct. 27, 2002.

International Search Report concerning International Application PCT/FI2005/050237 filed Jun. 23, 2005, Authorized Officer Mikko Flykt, pp. 1-3 (Feb. 24, 2006).

* cited by examiner

US 7,970,595 B2

SIMULATION OF MULTI-ANTENNA RADIO CHANNEL

CROSS-REFERENCE TO RELATED APPLICATIONS

This application is a National Phase application of International Application No. PCT/FI2005/050237 filed Jun. 23, 2005, which is incorporated herein by reference.

BACKGROUND OF THE INVENTION

1. Field of the Invention

The invention relates to a device for simulating a multi-antenna radio channel, a channel module for simulating a multi-antenna radio channel, and a method of simulating a multi-antenna radio channel.

2. Description of the Related Art

A simulation of multi-antenna radio channels, such as MIMO (Multiple Input, Multiple Output) radio channels, involves a simulation of propagation of a radio signal through a radio sub-channel between transmit antennas and receive antennas. In a typical radio channel simulator, each radio sub-channel is simulated in a radio channel unit. Typically, the radio channel units are pre-ceded by a pre-router, which switches antenna signals to an appropriate radio channel unit. Signals outputted by the radio channel units are fed into a postrouter, which combines the signals and routes the signals to appropriate output channels.

Routing and combining routines, however, involve external wiring which is prone to failure, and a complex switching matrices and adders. Therefore, it is useful to consider more advanced techniques for simulating multi-antenna radio channels.

SUMMARY OF THE INVENTION

An object of the invention is to provide an improved device, module and method. According to a first aspect of the invention, there is provided a device for simulating a multi-antenna radio channel, the device comprising channel modules for incorporating propagation effects into channel signals which represent radio signals propagating along propagation paths, which channel modules are electrically connected to neighbour channel modules for forming an (m,n) array configuration, at least one $(m,n)^{th}$ channel module being configured to receive a first $(m,n-1)^{th}$ channel signal and a second $(m-1,n)^{th}$ channel signal, the at least one $(m,n)^{th}$ channel module comprising: at least one processing resource for processing the first $(m,n-1)^{th}$ channel signal according to a channel model, thus generating a processed $(m,n)^{th}$ channel signal; and a combiner for combining the processed $(m,n)^{th}$ signal and the second $(m-1,n)^{th}$ channel signal, thus generating a second $(m,n)^{th}$ channel signal, the at least one $(m,n)^{th}$ channel module further being configured to output the second $(m,n)^{th}$ channel signal.

According to a second aspect of the invention, there is provided a channel module for simulating a multi-antenna radio channel, the channel module being configured to be electrically connectable to neighbour channel modules in an (m,n) array configuration, the channel module being configured to receive a first $(m,n-1)^{th}$ channel signal and a second $(m-1,n)^{th}$ channel signal, the channel module comprising: at least one processing resource for processing the first $(m,n-1)^{th}$ channel signal according to a channel model, thus generating a processed $(m,n)^{th}$ channel signal; and a combiner for combining the processed $(m,n)^{th}$ signal and the second $(m-1,n)^{th}$ channel signal, thus generating a second $(m,n)^{th}$ channel signal, the channel module further being configured to output the second $(m,n)^{th}$ channel signal.

According to another aspect of the invention, there is provided a method of simulating a multi-antenna radio channel, the method comprising: receiving a first $(m,n-1)^{th}$ channel signal and a second $(m-1,n)^{th}$ channel signal at an $(m,n)^{th}$ channel module electrically connected to neighbour channel modules configured into an array configuration; generating a processed $(m,n)^{th}$ channel signal by processing the first $(m,n-1)^{th}$ channel signal according to a channel model; combining the processed $(m,n)^{th}$ channel signal and the second $(m-1,n)^{th}$ channel signal, thus generating a second $(m,n)^{th}$ channel signal; and outputting the second $(m,n)^{th}$ channel signal.

The invention provides several advantages. Routing of channel signals propagating in a radio channel simulator is realized locally by electric connections and an array structure of channel modules which incorporate propagation effects into the channel signals. Local routing reduces a need for complex routing and switching systems, thus simplifying the structure of a radio channel simulator. In an embodiment, the invention further enables a radio channel simulator to be implemented with a modular structure, which is easily expandable.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS

Figure 1:
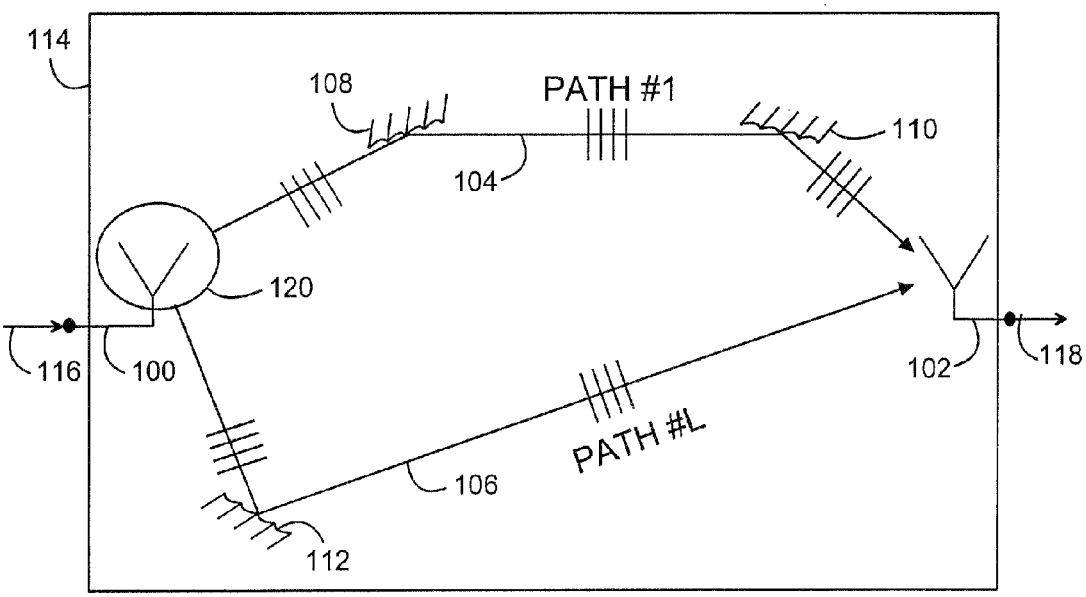
FIG. 1 illustrates a signal propagation environment typical of radio systems.

FIG. 1 illustrates a propagation channel 114 formed by a transmit receive-antenna pair, which comprises a transmit antenna 100 and a receive antenna 102. A transmit signal 116 is inputted into the transmit antenna 100, which converts the transmit signal 116 into an electromagnetic wave 120. A portion of the electromagnetic wave 120 propagates to the receive antenna 102, which converts the portion of the electromagnetic wave 120 into a receive signal 118.

The propagation channel 114 includes at least one propagation path 104, 106 for the electromagnetic wave 120. The propagation paths 104, 106 represent different routes of the electromagnetic wave 120 from the transmit antenna 100 to the receive antenna 118. The propagation paths 104, 106 typically represent routes which provide the most favourable propagation effects for the electromagnetic wave 120 in terms of the receive power of the electromagnetic wave 120 in the receive antenna 102. Each propagation path 104, 106 may have its characteristic propagation effects on the electromagnetic wave 120.

In a radio system, the electromagnetic wave 120 carries information from the transmit antenna 100 to the receive antenna 102. In multi-path propagation, the propagation channel 114 includes a plurality of propagation paths 104, 106. Typically, the amplitude of the receive signal 118 is a vector sum of the multi-path components of the electromagnetic field 120.

While propagating from the transmit antenna 100 to the receive antenna 102, the electromagnetic wave 120 is subjected to propagation effects, such as attenuation, absorption, reflection, scattering, diffraction, and refraction. Some of the propagation effects, such as absorption, reflection, scattering, diffraction, and refraction, may be caused by obstructions 108, 110, 112 encountered by the electromagnetic wave 120. Some of the obstructions 108, 110, 112 may move relative to the transmit antenna 100 and/or receive antenna 102. Typically, attenuation arises from a reduction in the power of the electromagnetic wave 120 as a function of the physical length of a propagation path 104, 106. In terms of characteristics of the electromagnetic wave 120, the propagation effects may affect the amplitude, phase and frequency of the electromagnetic wave 120.

Furthermore, the electromagnetic wave 120 may be interfered by other signal sources, such as radio transmitters, and thermal noise.

The propagation channel 114 further depends on the characteristics of the transmit antenna 100 and the receive antenna 102. The wave front associated with the electromagnetic wave 120 depends on the type of the transmit antenna 100. Furthermore, sampling of the portions of the electromagnetic wave 120 arriving at the receive antenna 102 depends on the type of the receive antenna 102. Therefore, the antenna characteristics of the transmit antenna 100 and the receive antenna 102 are preferably taken into account in a radio channel simulation.

It is noted that the exemplified propagation channel 114 shown in FIG. 1 illustrates a case wherein one transmit antenna 100 and one receive antenna 102 are applied. In the case of multi-antenna radio channels, at least three antennas are used for forming a radio channel. Each transmit-receive antenna pair forms an antenna-pair-specific propagation channel with antenna-pair-specific propagation paths.

Figure 2:
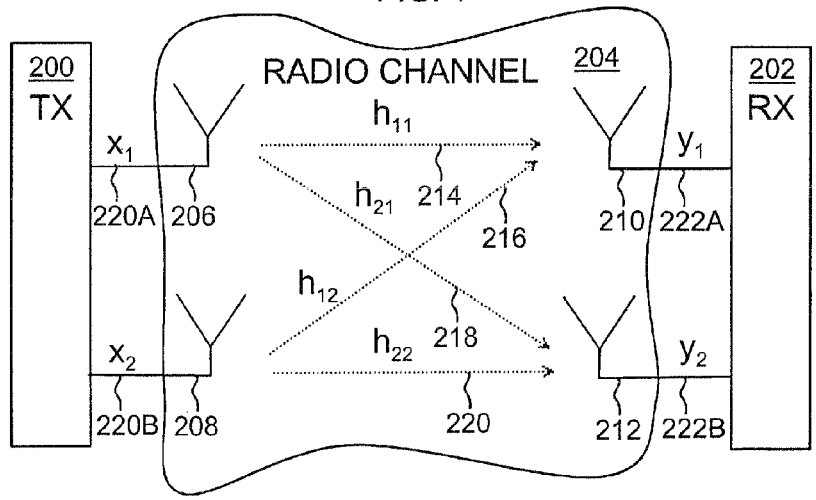
FIG. 2 illustrates an exemplified channel model by means of a block diagram.

Typically, a radio channel simulation is based on a channel model characterizing the propagation channels. FIG. 2 shows a block diagram representation of a radio channel and the associated radio channel parameters. The exemplified radio channel shown in FIG. 2 is a MIMO (Multiple-Input Multiple-Output), which is formed by using at least two transmit antennas 206, 208 and at least two receive antennas 210, 212.

A radio channel simulation may be performed between two transceivers, such as a base transceiver station and a mobile station, of a wireless telecommunications system. The invention is not, however, restricted to telecommunications system, but may be applied to any system applying at least three antennas in forming a radio channel.

It is clear to a person skilled in the art how to apply teachings learnt from a MIMO channel to simpler systems, such as MISO (Multiple-Input Single-Output) and SIMO (Single-Input Multiple-Output).

FIG. 2 shows a transmitter 200 connected to transmit antennas 206, 208, a receiver 202 connected to receive antennas 210, 212, and a radio channel 204 including the effects from the propagation paths 104, 106 and the antennas 208 to 212.

The transmitter 200 inputs transmit signals 220A and 220B into the transmit antennas 206 and 208, respectively. The receiver 202 receives a portion of the electromagnetic wave produced by the transmit antennas 206, 208 and outputs receive signals 222A and 222B from the receive antennas 210 and 212, respectively.

FIG. 2 further shows propagation channels 214, 216, 218, and 220.

In an embodiment, the radio channel 204 may be characterized using a channel equation $$[y_1 \ldots y_N] = \begin{bmatrix} h_{11} & \cdots & h_{1M} \\ \vdots & & \vdots \\ h_{N1} & \cdots & h_{NM} \end{bmatrix} \begin{bmatrix} x_1 \\ \vdots \\ x_M \end{bmatrix}, \quad (1)$$

wherein vector component $x_k$ (k=1, ..., M) of the transmit signal vector represents a transmit signal directed at the $k^{th}$ transmit antenna, vector component of the receive signal vector $y_j$ (j=1, ..., N) represents a receive signal outputted by the $j^{th}$ receive antenna, and coefficient $h_{kj}$ represents the portion of the radio channel associated with the $k^{th}$ transmit antenna and the $j^{th}$ receive antenna. The channel coefficients may also be called a channel tap and/or an impulse response. In a wideband channel with bandwidth B, the channel taps may further characterize the frequency response of the propagation channel.

The temporal variation of the radio channel and a multi-path propagation may be accounted for by writing $$h_{kj}(t) = h_{kj}(h_{kj}^1(t), \ldots, h_{kj}^l(t), \ldots, h_{kj}^L(t)) \quad (2)$$

$$y_j(t) = y_j(y_j^1(t), \ldots, y_j^l(t), \ldots, y_j^L(t)) \quad (3)$$

wherein superscript l refers to an $l^{th}$ propagation path. Each propagation path l may be associated with a propagation-path-specific channel coefficient $h_{kj}^l(t)$ and a receive signal $y_j^l(t)$. The channel coefficient $h_{kj}^l(t)$ and the receive signal $y_j^l(t)$ may have or may not have a time dependence. The channel coefficients $h_{kj}^l(t)$ are typically complex variables.

Figure 3:
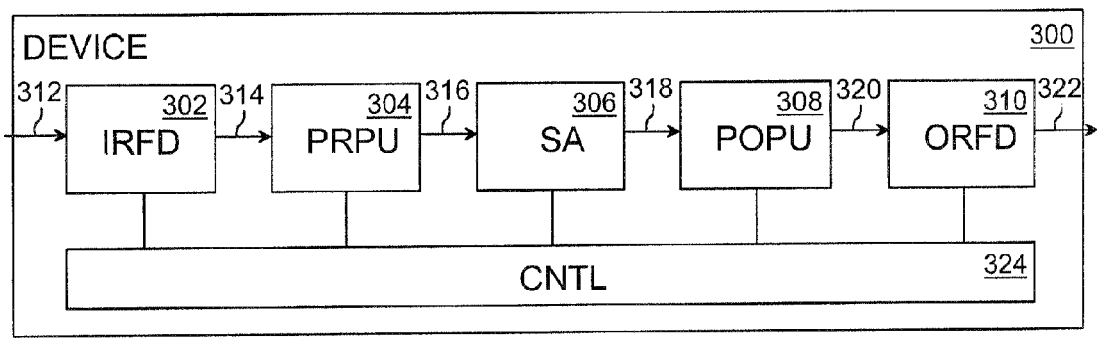
FIG. 3 shows an example of a structure of a device for simulating a multi-antenna radio channel.

With reference to an example shown in FIG. 3, a device 300 for simulating a multi-antenna radio channel typically includes an input radio frequency domain (IRFD) 302, which receives radio frequency input signals 312 and converts the radio frequency input signals 312 into baseband input signals 314.

The radio frequency input signals 312 may be transmit radio frequency antenna signals, such as MIMO transmit signals, generated in a device representing a radio transmitter, such as a base station or a mobile station, for example.

The baseband input signals 314 are inputted into a pre-processing unit (PRPU) 304, which is responsible for tasks such as scaling, packetizing, time sharing, frequency division and/or IQ-division of the baseband input signals 314.

The pre-processing unit 304 outputs channel signals 316 which represent radio signals entering into propagation paths 104, 106 to be simulated.

The channel signals 316 are inputted into a simulation array (SA) 306, which incorporates propagation effects of the multi-antenna radio channel into channel signals 316. The propagation of channel signals in the multi-antenna radio channel is simulated by subjecting the channel signals to chains of mathematical operations.

In an embodiment of the invention, the simulation array 306 is used for simulating an M×N MIMO radio channel provided by M transmit antennas and N receive antennas. In such a case, each column of the simulation matrix simulates an M×1 portion of the simulation.

The simulation array 306 outputs channel signals 318, which represent radio signals exiting the propagation paths 104, 106.

The channel signals 318 are inputted into a post-processing unit (POPU) 308, which processes the channel signals 318 by, for example, by combining the channel signals 318.

The post-processing unit 308 outputs baseband output signals 320 into an output radio frequency domain (ORFD) 310, which converts the baseband output signals 320 into radio frequency output signals 322. The radio frequency output signals may be MIMO receive signals, for example.

The device 300 may further comprise a controller 324 for controlling the functional blocks 302 to 310 of the device 300. A control may include tasks such as synchronizing bit flows in the device 300, programming the channel modules of the simulation array 306 according to the channel model, and control of input/output traffic.

Figure 4A:
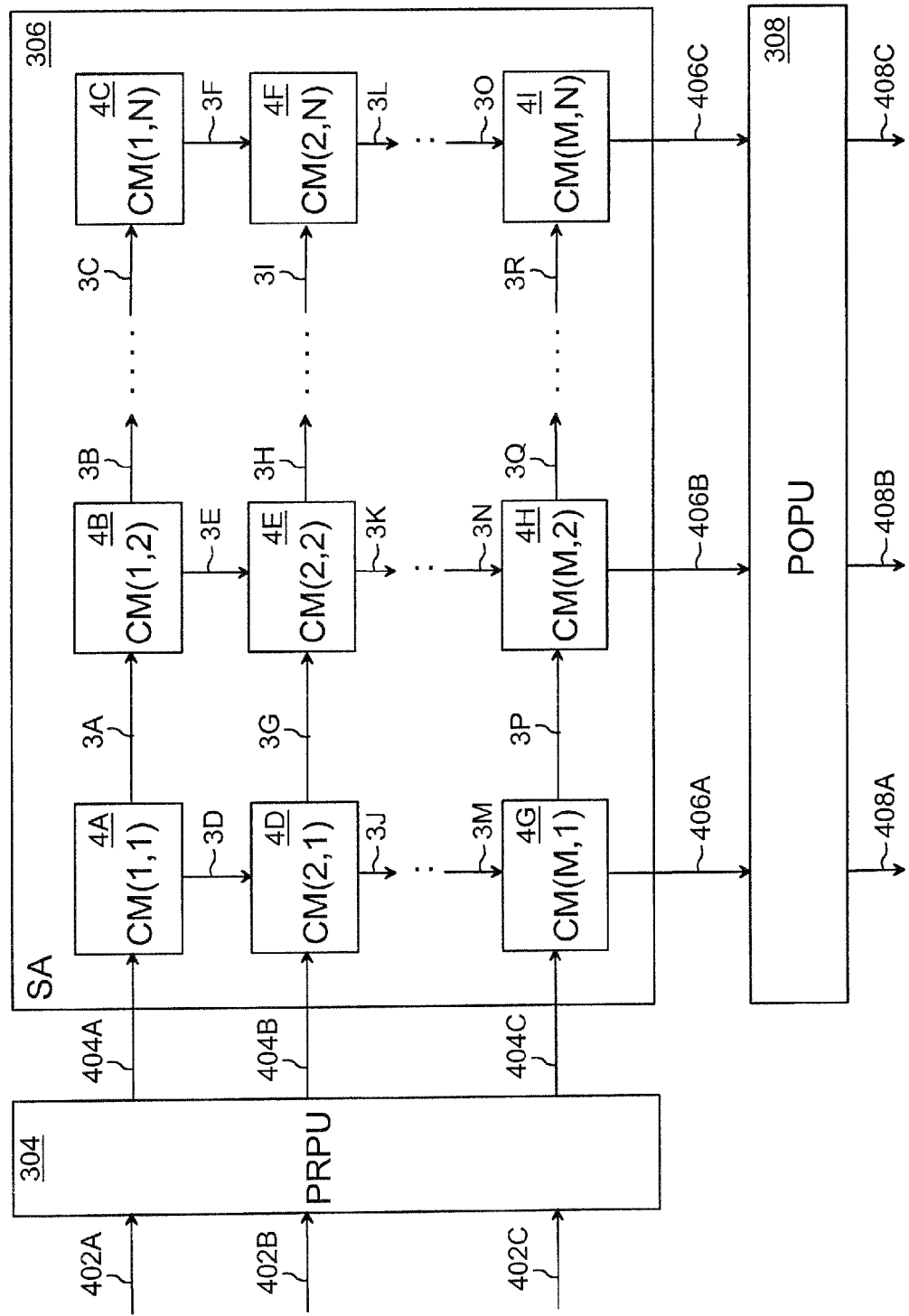
FIG. 4A illustrates a structure of a simulation array.

With reference to FIG. 4A, the simulation array 306 comprises channel modules (CM) 4A to 4I which incorporate propagation effects into channel signals 404A to 404C, 3A to 3R representing radio signals propagating along propagation paths 104, 106. The channel modules 4A to 4I are electrically connected in an (m,n) array configuration, where each (m,n)$^{th}$ channel module is electrically connected to neighbour (m,n)$^{th}$ channel modules. In the notation adopted, each (m,n)$^{th}$ channel module is associated with different (m,n) indices such that m and n indicate rows and columns, respectively, of the simulation array 306.

A channel signal 404A to 404C, 3A to 3R may involve 32 bits trans-ported over a parallel bus. The channel signal 404A to 404C, 3A to 3R may include 16 bits dedicated to a Q component and 16 bits dedicated to an I component. The clock frequency of the data transport may be 200 MHz, for example.

The dimensions of the simulation array 306 are M and N, where M and N are the maximum of m and n, respectively.

The channel signals 404A to 404C, 3A to 3R are identified with (m,n) labels. A first (m,n)$^{th}$ channel signal 404A to 404C, 3A to 3C, 3G to 3I, 3P to 3R is a channel signal generated in an (m,n)$^{th}$ channel module and/or the pre-processing unit 304 and received by an (m,n+1)$^{th}$ channel module. The first (m,n)$^{th}$ channel signals 404A to 404C, 3A to 3C, 3G to 3I, 3P to 3R propagate in the horizontal direction in the simulation array 306.

A second (m,n)$^{th}$ channel signal 406A to 406C, 3D to 3F, 3J to 3L, 3M to 3O is a channel signal outputted by an (m,n)$^{th}$ channel module and received by an (m+1,n)$^{th}$ channel module or the post-processing unit 308. The second (m,n)$^{th}$ channel signals 406A to 406C, 3D to 3F, 3J to 3L, 3M to 3O propagate in the vertical direction in the simulation array 306.

Channel signals 404A to 404C outputted by the pre-processing unit 304 are denoted by (m,n=0). In terms of the channel equation (1), the channel signals 404A to 404C outputted by the pre-processing unit 304 may represent $x_m$ components of the column vector of the right-hand side of equation (1).

Channel signals 406A to 406C outputted by the simulation array 306 are denoted by (M,n). In terms of the channel equation (1), the channel signals 406A to 406C outputted by the simulation array 306 may represent $y_n$ components of the vector of the left-hand side of equation (1).

The pre-processing unit 304 may be provided with a plurality of baseband input signals 402A to 402C which may represent transmit antenna signals in the base band domain. In an embodiment of the invention, the pre-processing unit 304 is capable of routing each baseband input signal 402A to 402C into any (m,n=1)$^{th}$ channel module 4A, 4D, 4G. Routing may be implemented with switches controlled by the controller 324.

In an embodiment of the invention, the post-processing unit 308 is capable of converting any (m=M,n)$^{th}$ channel signal 406A to 406C to any base band output signal 408A to 408C. A conversion may be implemented with switches controlled by the controller 324. The post-processing unit 308 may further comprise a combiner, such as an adder, for combining at least two (m=M,n)$^{th}$ channel signals 406A to 406C into a single baseband output signal 408A to 408C.

Figure 4B:
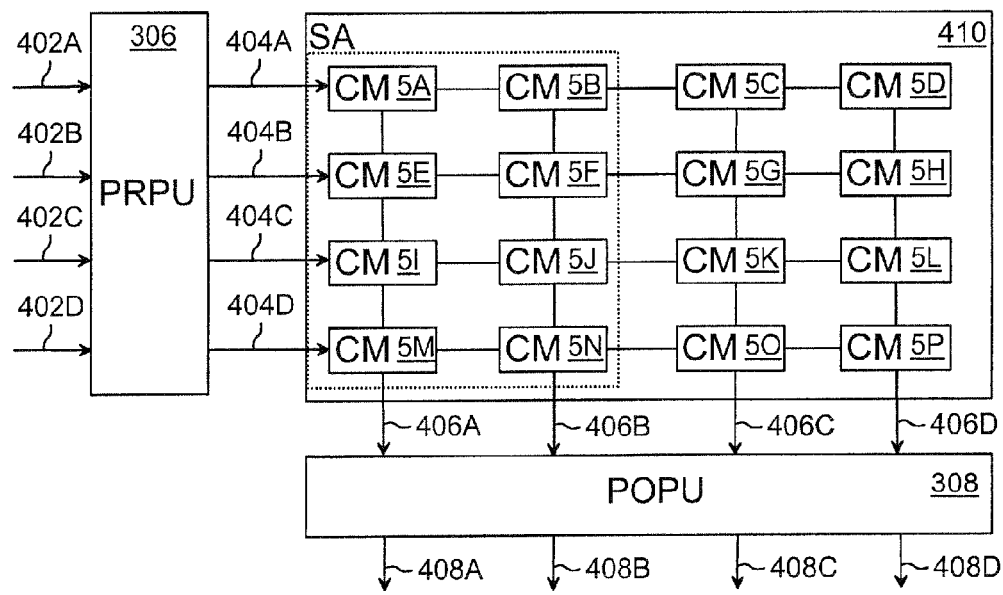
FIG. 4B illustrates a structure of a simulation array.

With reference to FIG. 4B, let us consider a simulation array 410 capable of simulating a 4×4 MIMO system.

In this case, the pre-processing unit 304 receives four baseband input signals 402A to 402D and inputs four channel signals 404A to 404D into the simulation array 410. The simulation array 410 routes and processes the channel signals and outputs four channel signals 406A to 406D to the post-processing unit 308. The post-processing unit 308 receives the four channel signals 406A to 406D and outputs four baseband output signals 408A to 408D. In this case, each column of the simulation array is used for simulating a 4×1 MIMO sub-channel.

The routing and conversion enabled by the pre-processing unit 304 and the post-processing unit 308 make it possible to allocate processing power to desired sub-channels. For example, the 4×4 simulation array 410 may be used for simulating a 4×3 MIMO system by combining channel signals 406A and 406B into a single baseband output signal 408A. In this case, columns inside a dotted rectangle are allocated to one of the 1×3 MIMO sub-channels.

If the bandwidth of the radio signal being simulated is narrow, a single channel module 5A to 5P may be used for simulating a plurality of subchannels. In terms of the channel model of Equation (1), a single channel module 5A to 5P implements more than one $h_{mn}$ channel taps. The sub-channels may be simulated by time-multiplexing the channel module between the sub-channels.

Figure 5:
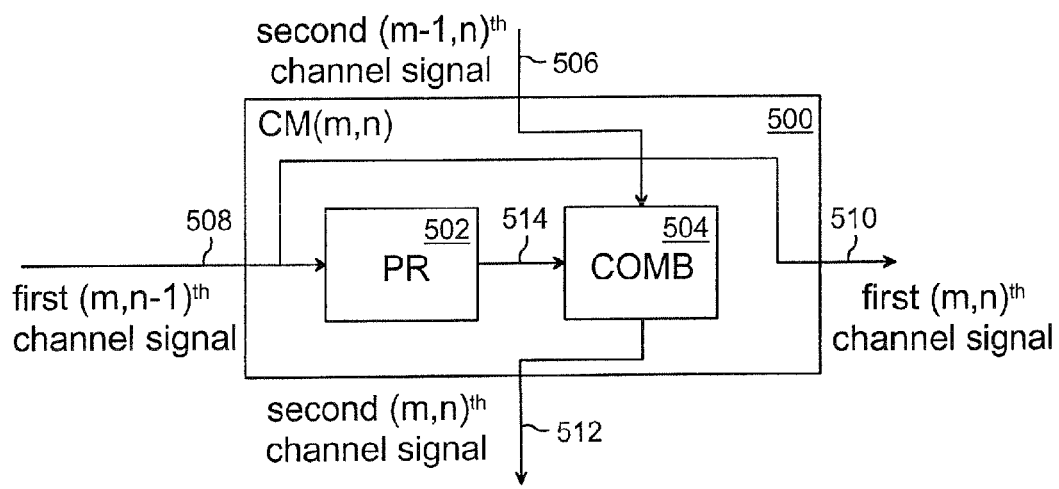
FIG. 5 shows a first example of a channel module.

With reference to FIG. 5, an (m,n)$^{th}$ channel module 500 comprises a processing resource (PR) 502 and a combiner (COMB) 504 connected to the processing resource 502.

The processing resource 502 receives a first (m,n−1)$^{th}$ channel signal 508 from the (m,n−1)$^{th}$ channel module or from the pre-processing unit 304 and processes the first (m,n−1)$^{th}$ channel signal 508 according to the channel model being applied to a radio channel simulation. As a result of processing, a processed (m,n)$^{th}$ channel signal 514 is obtained. In terms of the channel equation (1), the (m,n)$^{th}$ channel module may implement an $h_{mn}(t)$ channel tap shown in equation (2).

The processing resource 502 inputs the processed (m,n)$^{th}$ channel signal 514 into the combiner 504 which combines the processed (m,n)$^{th}$ channel signal 514 with a second (m−1,n)$^{th}$ channel signal 506 received from a (m−1,n)$^{th}$ channel module, thus resulting in a second (m,n)$^{th}$ channel signal 512. The combiner 504 outputs the second (m,n)$^{th}$ channel signal 512 into an (m+1,n)$^{th}$ channel module or into the post-processing unit 308.

Each channel module in a same row of the simulation array 306 is provided with a same first channel signal. For example, channel signals 3A to 3C equal channel signal 404A, channel signals 3G to 3I equal channel signal 404B and channel signals 3P to 3R equal channel signal 404C.

In an embodiment of the invention, the channel modules in the same row are electrically connected with the neighbour channel modules via an external connection. The external connection may be provided by a printed board or another structure onto which the channel modules 4A to 4I are attached.

In an embodiment of the invention, the $(m,n)^{th}$ channel module 500 is configured to output the first $(m,n-1)^{th}$ channel signal 508 as a first $(m,n)^{th}$ channel signal 510, thus enabling local routing of the horizontal signals in the simulation array 306. The local routing may be implemented by connecting an input bus of the first $(m,n-1)^{th}$ channel signal 510 to the output bus of the first $(m,n)^{th}$ channel signal 510.

The combiner 504 may be an adder or a multiplier, for example.

In an embodiment of the invention, the channel modules 4A to 4I of the simulation array 306 are identical with each other, comprising the processing resource 502 and the combiner 504. The uppermost channel modules 4A to 4C denoted by (m=1,n) may be provided with zero bits as second (m=1, n)$^{th}$ channel signals. The zero bits may be generated in the uppermost channel modules 4A to 4C.

Figure 6:
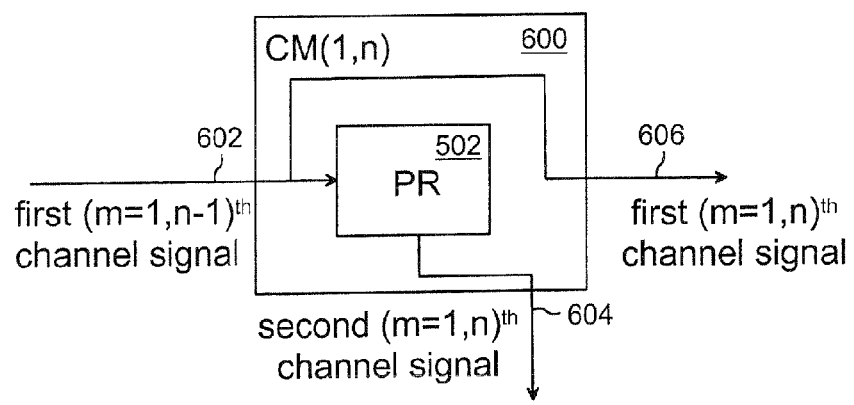
FIG. 6 shows a second example of a channel module.

With reference to FIG. 6, in an embodiment of the invention, an $(m=1,n)^{th}$ channel module 600 is configured to receive a first $(m=1,n-1)^{th}$ channel signal 602. The $(m=1,n)^{th}$ channel module 600 corresponds to a channel module 4A to 4C of FIG. 4A, for example. The $(m=1,n)^{th}$ channel module 600 comprises at least one processing resource 502 for incorporating the propagation effect into the first $(m=1,n-1)^{th}$ channel signal 602, thus generating a second $(m=1,n)^{th}$ channel signal 604. The $(m=1,n)^{th}$ channel module 600 further outputs the second $(m=1,n)^{th}$ channel signal 604.

The channel module 600 may bypass the first $(m=1,n)^{th}$ channel signal 602 and output the first $(m=1,n+1)^{th}$ channel signal 606.

Figure 7:
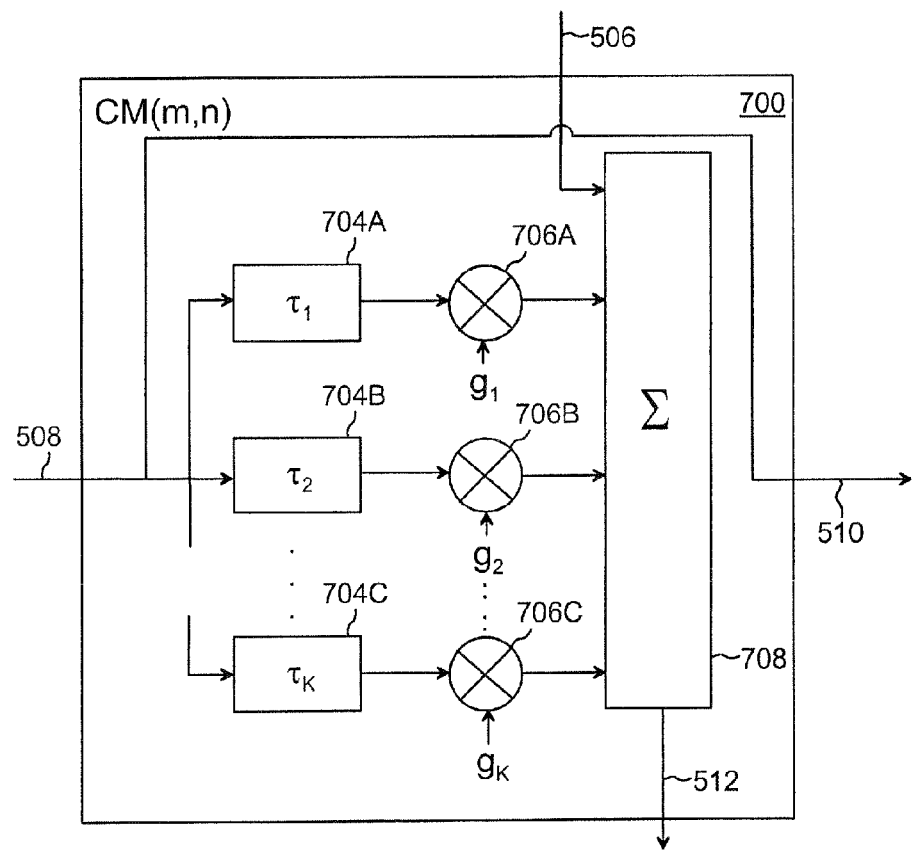
FIG. 7 shows a third example of a channel module.

With reference to FIG. 7, an $(m,n)^{th}$ channel module 700 may comprise K delay elements 704A to 704C, K multipliers 706A to 706C and an adder 708. Delay lengths of the delay elements 704A, 704B and 704C are represented by $\tau_1, \tau_2, \tau_K$ respectively. Multiplying coefficients of the multipliers 706A, 706B and 706C are represented by $g_1, g_2$ and $g_K$, respectively. Values of the delay lengths and multiplying coefficients may be varied according to control of the controller 324, for example. Furthermore, relative positions of the delay elements 704A to 704C and those of the multipliers 706A to 706C may be controlled by switches not shown in FIG. 7. A switch configuration may be controlled by the controller 324.

In FIG. 7, the delay element 704A and the multiplier 706A provide a representation of a first propagation path, the delay element 704B and the multiplier 706B of a second propagation path, and the delay element 704C and the multiplier 706C of a third propagation path of an $(m,n)^{th}$ propagation channel. The first $(m,n-1)^{th}$ channel signal 508 is delayed in the delay elements 704A to 704C and multiplied in the multipliers 706A to 706C according to the desired characteristic of the three propagation paths. The channel signals propagated through the propagation paths are combined in the adder 708. Furthermore, the second $(m-1,n)^{th}$ channel signal 506 may be combined with the channel signals in the adder 708.

Figure 8:
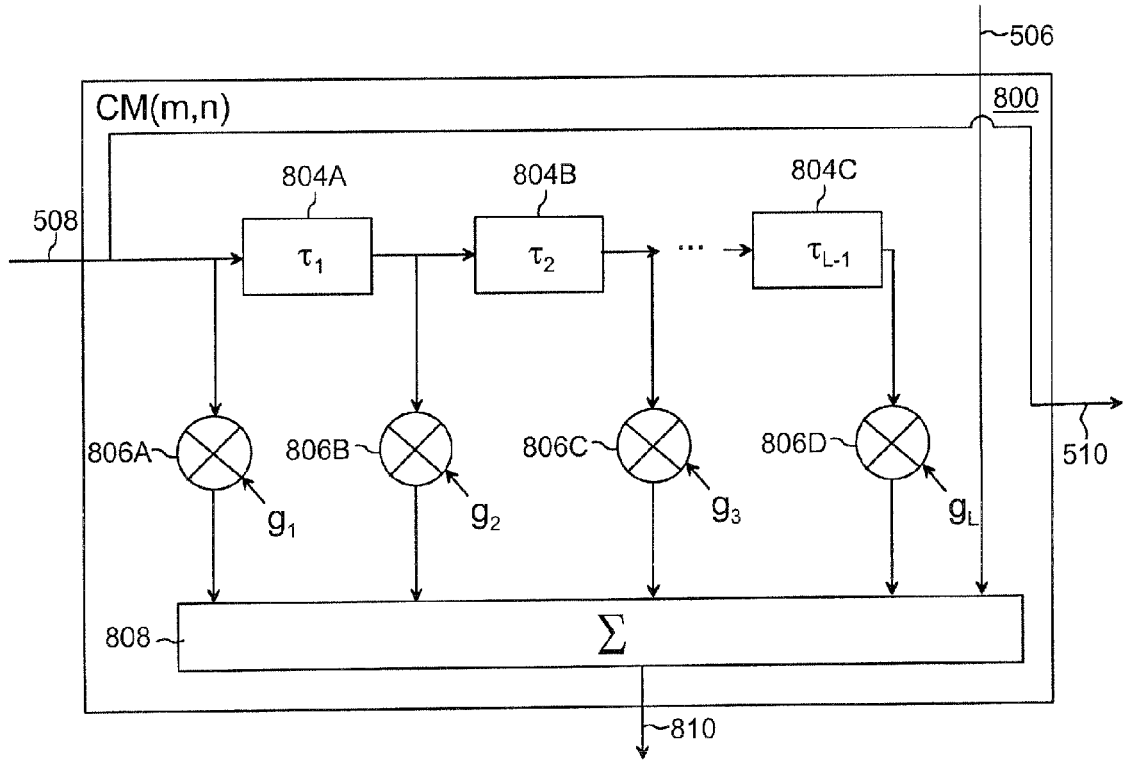
FIG. 8 shows another example of a channel module.

In FIG. 8, L−1 delay elements 804A to 804C are connected in series. The first $(m,n-1)^{th}$ channel signal 508 is inputted into a chain of delay elements 806A, 806B, 806C, and after each delay element 806A, 806B, 806C, a signal is conducted to a multiplier 806A to 806D. The signals outputted by the multipliers 806A to 806D are co-added in an adder 808. The adder 808 outputs a second $(m-1,n)^{th}$ channel signal 810.

A channel module 700, 800 may be implemented with ASICs (Application Specific Integrated Circuit) and/or FPGAs (Field Programmable Gate Array).

Figure 9:
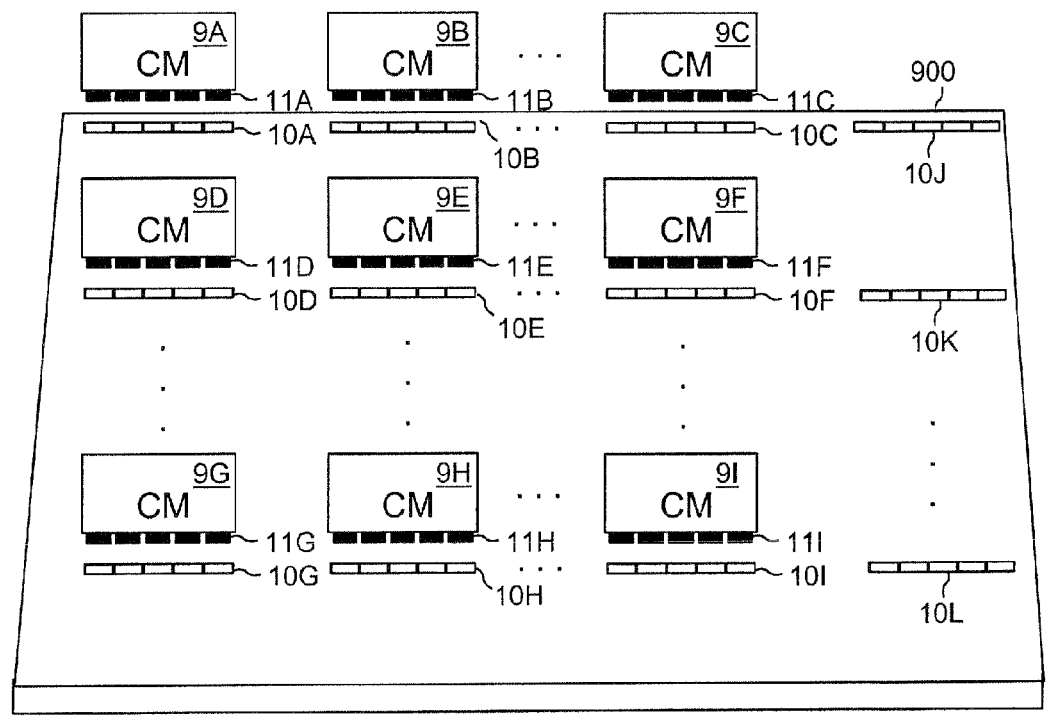
FIG. 9 shows a first example of an implementation of a simulation array.

With reference to FIG. 9, the device may comprise a printed board 900 on which channel modules 9A to 9I may be assembled and connected. The printed board 900 may comprise channel module interfaces 10A to 10L which adapt channel modules 9A to 9I.

The channel modules 9A to 9I comprise buses 11A to 11C for attaching the channel modules 9A to 9I to the channel module interfaces 10A to 10L.

The channel module interfaces 10A to 10L may be quick-disconnect connectors which enable an instant installation of the channel modules 9A to 9I to the channel module interfaces 10A to 10L. In an embodiment, the channel modules are connected permanently to the channel module interfaces 10A to 10L.

The channel module interfaces 10A to 10L are connected to each other in an array configuration, thus enabling an array configuration of the channel modules 9A to 9I being formed when the channel modules 9A to 9I are assembled to the printed board 900.

The printed board 900 may include vacant channel module interfaces 10J to 10L in order to enable channel modules to be added onto the printed board after the purchase of the device. Furthermore, the vacant channel module interfaces 10J to 10L provide a possibility of changing the array configuration by moving channel modules 9A to 9I from a channel module interface 10A to 10L to another. With this procedure, the array configuration may be changed from a 4×4 configuration to a 2×8 configuration, for example.

Figure 10:
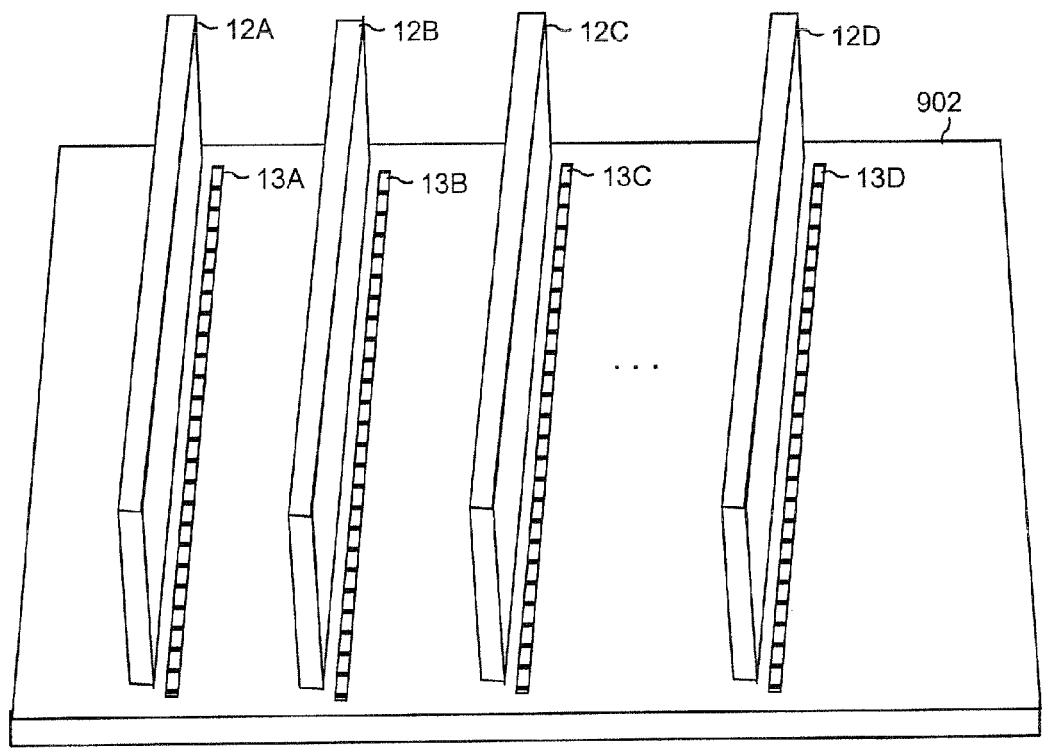
FIG. 10 shows a second example of an implementation of a simulation array.

With reference to FIG. 10, the printed board 902 comprises channel module interfaces 13A to 13D, each of which is capable of connecting to a plurality of channel modules. In this case, the channel modules may be implemented onto sub-units 12A to 12D, each of which comprises channel modules of one column of the simulation array 306, for example. In this case, the connections required for vertical signals, such as channel signals 3D to 3F, 3J to 3L, 3M to 3O shown in FIG. 4, may be routed within the sub-units 12A to 12D.

Figure 11:
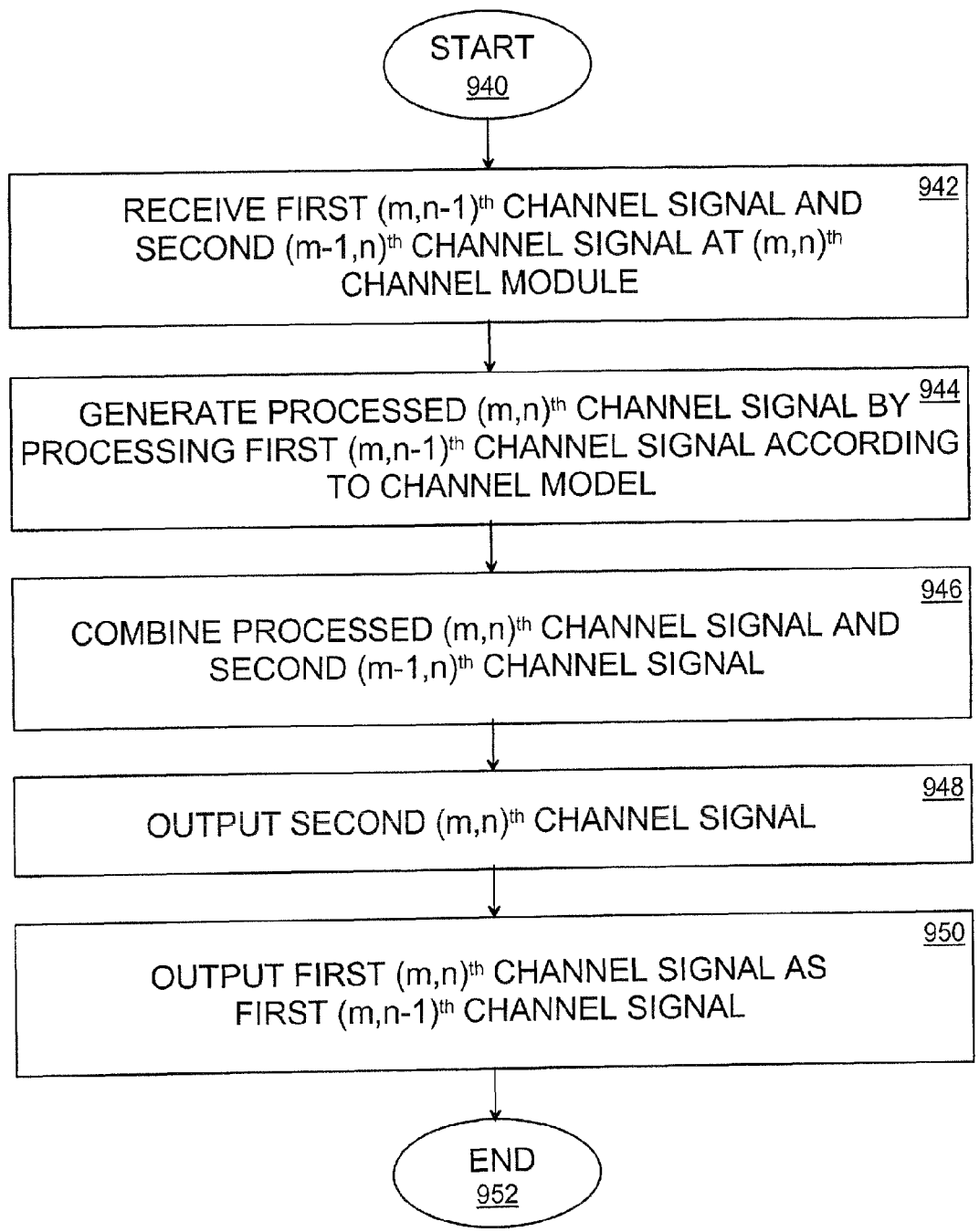
FIG. 11 illustrates a methodology according to embodiments of the invention.

With reference to FIG. 11, a methodology according to embodiments of the invention is illustrated with a flow chart.

In 940, the method starts.

In 942, a first $(m,n-1)^{th}$ channel signal 508 and a second $(m-1,n)^{th}$ channel signal 506 are received at an $(m,n)^{th}$ channel module 500 electrically connected to neighbour channel modules configured into an array configuration.

In 944, a processed $(m,n)^{th}$ channel signal 514 is generated by processing the first $(m,n-1)^{th}$ channel signal 508 according to a channel model.

In 946, the processed $(m,n)^{th}$ channel signal 514 and the second $(m-1,n)^{th}$ channel signal are combined, thus generating a second $(m,n)^{th}$ channel signal 512.

In 948, the second $(m,n)^{th}$ channel signal 512 is outputted.

In 950, the first $(m,n-1)^{th}$ channel signal 508 is outputted as a first $(m,n)^{th}$ channel signal 510.

In 952, the method ends.

Even though the invention has been described above with reference to an example according to the accompanying drawings, it is clear that the invention is not restricted thereto but it can be modified in several ways within the scope of the appended claims.

What is claimed is:

1. A device for simulating a multi-antenna radio channel, the device comprising:

channel modules configured to incorporate propagation effects into channel signals which represent radio signals propagating along propagation paths, the channel modules being electrically connected to neighbour channel modules to form an (m,n) array configuration of the channel modules in which m and n are greater than 1, at least one $(m,n)^{th}$ channel module of the (m,n) array configuration being configured to receive a first $(m,n-1)^{th}$ channel signal from a $(m,n-1)^{th}$ channel module in a prior column of the (m,n) array configuration and a second $(m-1,n)^{th}$ channel signal from a $(m-1,n)^{th}$ channel module in a prior row of the (m,n) array configuration, the at least one $(m,n)^{th}$ channel module comprising:

at least one processing resource configured to process the first $(m,n-1)^{th}$ channel signal according to a channel model, thus generating a processed $(m,n)^{th}$ channel signal; and a combiner configured to combine the processed $(m,n)^{th}$ channel signal and the second $(m-1,n)^{th}$ channel signal, thus generating a second $(m,n)^{th}$ channel signal, the at least one $(m,n)^{th}$ channel module further being configured to output the second $(m,n)^{th}$ channel signal, the $(m,n)^{th}$ channel module being configured to output the first $(m,n-1)^{th}$ channel signal as a first $(m,n)^{th}$ channel signal.

2. The device of claim 1, wherein an $(m=1,n)^{th}$ channel module is configured to receive a first $(m=1,n-1)^{th}$ channel signal, the at least one $(m=1,n)^{th}$ channel module comprising at least one processing resource for incorporating a propagation effect into the first $(m=1,n-1)^{th}$ channel signal, thus generating a second $(m=1,n)^{th}$ channel signal, the at least one $(m=1,n)^{th}$ channel module further being configured to output the second $(m=1,n)^{th}$ channel signal.

3. The device of claim 1, wherein the device further comprises a plurality of channel module interfaces connected in an array configuration, each channel module interface configured to adapt at least one channel module, the channel module comprising a bus for connecting to a channel module interface.

4. A channel module for simulating a multi-antenna radio channel, the channel module being configured to receive a first $(m,n-1)^{th}$ channel signal and a second $(m-1,n)^{th}$ channel signal, the channel module comprising:

at least one processing resource configured to process the first $(m,n-1)^{th}$ channel signal according to a channel model, thus generating a processed $(m,n)^{th}$ channel signal, the channel module being configured to be electrically connectable to neighbor channel modules in an (m,n) array configuration of the channel modules in which m and n are greater than 1, the channel module of the (m,n) array configuration being configured to receive a first $(m,n-1)^{th}$ channel signal from a $(m,n-1)^{th}$ channel module in a prior column of the (m,n) array configuration and a second $(m-1,n)^{th}$ channel signal from a $(m-1,n)^{th}$ channel module in a prior row of the (m,n) array configuration, the channel modules incorporating propagation effects into channel signals which represent radio signals propagating along propagation paths; and a combiner configured to combine the processed $(m,n)^{th}$ channel signal and the second $(m-1,n)^{th}$ channel signal, thus generating a second $(m,n)^{th}$ channel signal, the channel module further being configured to output the second $(m,n)^{th}$ channel signal, the channel module being configured to output the first $(m,n-1)^{th}$ channel signal as a first $(m,n)^{th}$ channel signal.

5. The channel module of claim 4, wherein the channel module comprises a bus configured to connect to a channel module interface.

6. A method of simulating a multi-antenna radio channel, the method comprising:

receiving a first $(m,n-1)^{th}$ channel signal and a second $(m-1,n)^{th}$ channel signal at an $(m,n)^{th}$ channel module electrically connected to neighbour channel modules configured in an (m,n) array configuration of the channel modules in which m and n are greater than 1, the channel modules incorporating propagation effects into channel signals which represent radio signals propagating along propagation paths, at least one $(m,n)^{th}$ channel module of the (m,n) array configuration being configured to receive a first $(m,n-1)^{th}$ channel signal from a $(m,n-1)^{th}$ channel module in a prior column of the (m,n) array configuration and a second $(m-1,n)^{th}$ channel signal from a $(m-1,n)^{th}$ channel module in a prior row of the (m,n) array configuration;

generating a processed $(m,n)^{th}$ channel signal by processing the first $(m,n-1)^{th}$ channel signal according to a channel model;

combining the processed $(m,n)^{th}$ channel signal and the second $(m-1,n)^{th}$ channel signal, thus generating a second $(m,n)^{th}$ channel signal;

outputting the second $(m,n)^{th}$ channel signal; and outputting the first $(m,n-1)^{th}$ channel signal as a first $(m,n)^{th}$ channel signal.

\* \* \* \* \*